May 30, 1950     J. B. STIER     2,509,537
COMBINED BAG, SEAT, AND BACK REST
Filed April 24, 1947     2 Sheets-Sheet 1
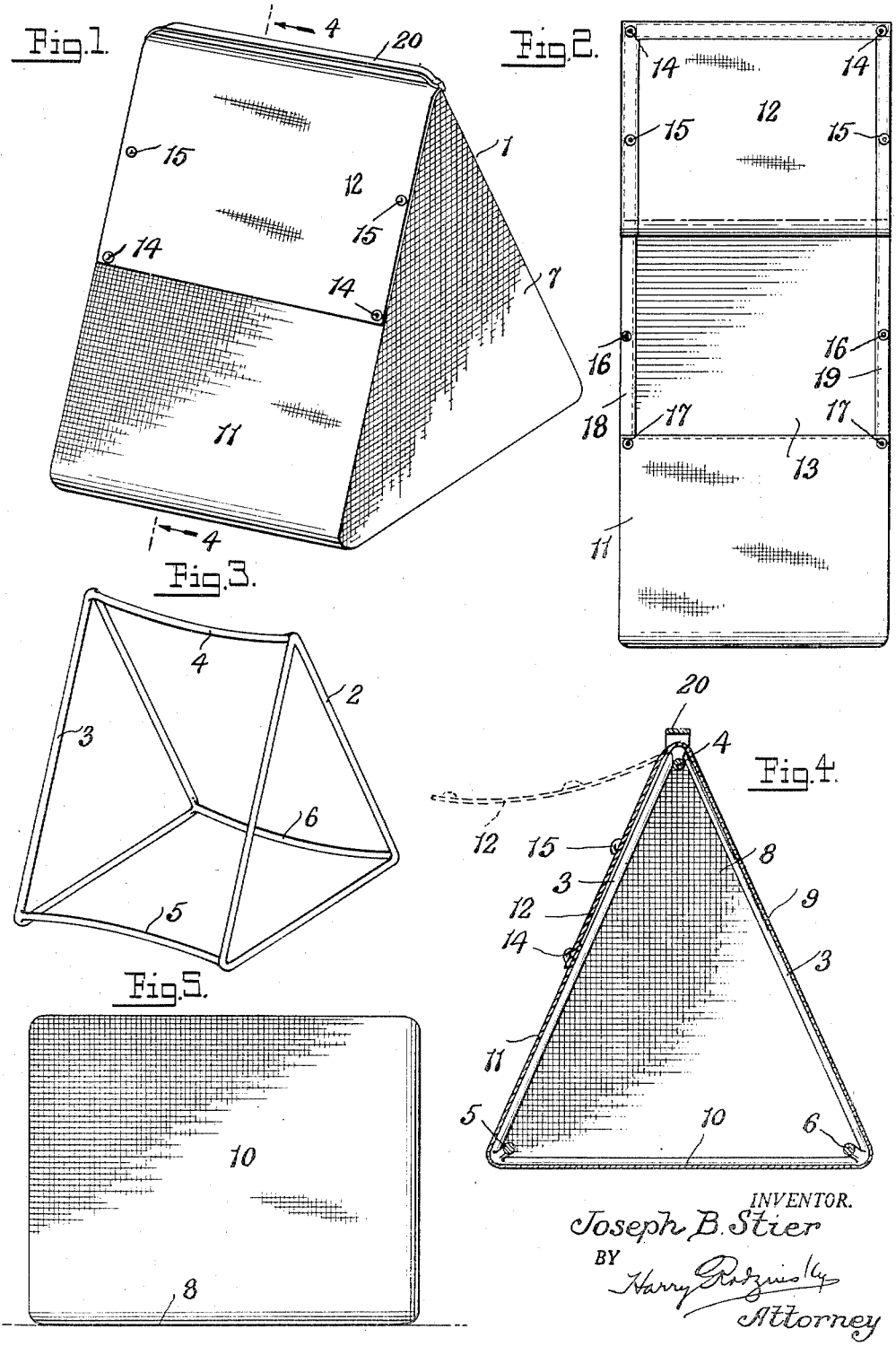
INVENTOR.
Joseph B. Stier
BY Harry Radzinsky
Attorney May 30, 1950  J. B. STIER  2,509,537
COMBINED BAG, SEAT, AND BACK REST
Filed April 24, 1947  2 Sheets-Sheet 2

INVENTOR.
Joseph B. Stier
BY
Harry Radzinsky
Attorney

Patented May 30, 1950

2,509,537

UNITED STATES PATENT OFFICE 2,509,537

COMBINED BAG, SEAT, AND BACK REST

Joseph B. Stier, New York, N. Y.

Application April 24, 1947, Serial No. 743,512

2 Claims. (Cl. 190—42)

This invention relates to a combination beach bag, seat, and back-rest and has for one of its objects, the provision of an article of this character which will be of light weight, sturdy construction, and of good containing capacity, enabling it to perform its intended functions in a useful and satisfactory manner.

The primary object of the invention is to provide a bag, suitable for use at bathing beaches, for picnicing, automobile trips, and similar purposes, which can be used for containing bathing suits, robes, towels, lunch and other articles and materials used at the beach or elsewhere, the device also being so constructed and of such a nature that it can be used as a seat or as a back-rest. The construction of the device is such that it may be made attractively and sturdily so that it will not only be of pleasing appearance and readily portable but will be able to withstand the use and abuse to which articles of this kind are subjected.

More particularly, the invention contemplates the provision of a substantially triangulated or wedge-shaped frame of a rigid but lightweight construction, over which is disposed a fabric covering, the covering being preferably, but not necessarily, of water-repellant material, the covering thus providing a receptacle or container within which various articles may be stored and manually transported, the covering being provided with a flap permitting access to the interior of the receptacle thus provided. The frame over which the covering is disposed is of such strength and shape that the device can be made to function as a seat, and due to its triangulated formation will provide an inclined surface capable of serving as a back-rest.

These and other objects are attained by the invention, a more particular description of which will hereinafter appear and be set forth in the claims appended hereto.

Figure 6:
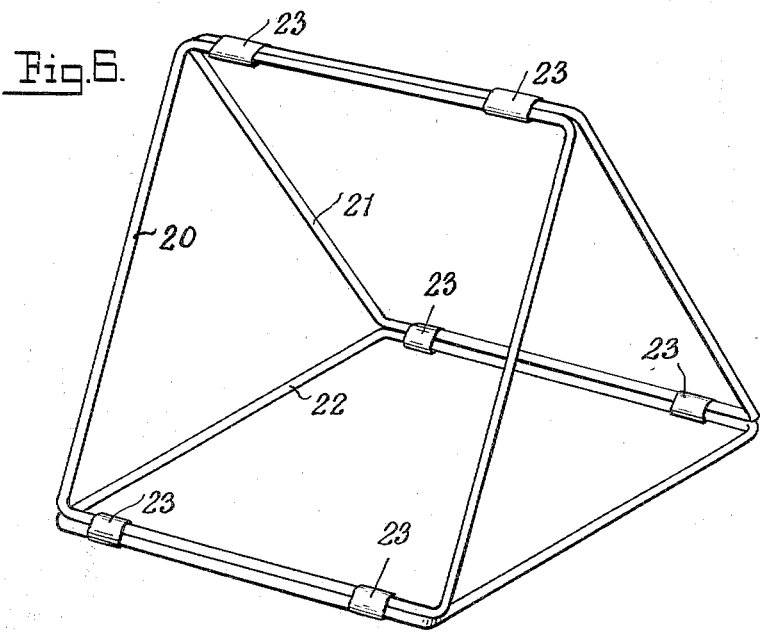
Figure 7:
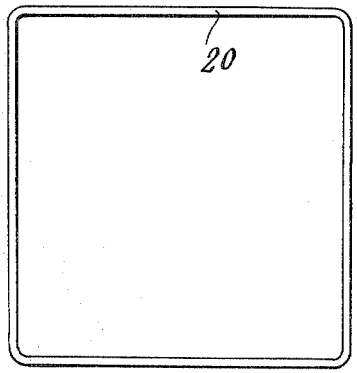
Figure 8:
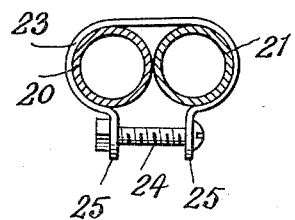

In the accompanying drawing, wherein an illustrative embodiment of the invention is disclosed, Fig. 1 is a perspective view of a combined bag, seat and back-rest constructed in accordance with the invention; Fig. 2 is a front elevation of the same, showing the closure flap in its raised or open position; Fig. 3 is a perspective view of the frame; Fig. 4 is a sectional view taken on the line 4—4 of Fig. 1, looking in the direction of the arrows; Fig. 5 shows the bag resting on one of its sides in position to be used as a seat; Fig. 6 is a perspective view of a modified frame structure; Fig. 7 is a view of one of the frame members, and Fig. 8 is a sectional view through parts of the frame showing a coupling.

In the drawing, the improved bag is shown at 1, the same including a frame most clearly disclosed in Fig. 3. The frame is preferably composed of metal rod or tubing of relatively light weight, such as aluminum or aluminum alloy, and it includes a pair of similar triangulated side frame members 2 and 3 maintained in suitably spaced relation by means of the three cross rods 4, 5 and 6 which connect the apices of the two frames 2 and 3. Said rods in the embodiment of Figs. 1 to 5, are preferably secured at their ends to the frame members 2 and 3 by being welded or brazed thereto with the result that the triangular frame so produced is rendered of one-piece or integral construction and is of exceptional lightness and strength. It will be observed that the cross-bars 4, 5 and 6 are of arcuate or inwardly-bowed shape.

Over the frame of Fig. 3 is placed the covering, which may be composed of suitable fabric or textile material, and preferably of waterproof, or at least water-repellant material. The covering includes the two side panels 7 and 8 which completely cover the frames 2 and 3, and it includes a back panel 9, bottom panel 10 and front panel 11. The front panel 11 extends approximately half way up the front of the frame, the upper half of the front of the frame being open as at 13, this opening being covered by a foldable closure flap 12, shown in open position in Fig. 2. When the closure flap is in its raised or open position, as shown in Fig. 2, it exposes the opening 13 through which access to the interior of the bag is had, and through which various articles may be inserted or removed from the bag.

The closure flap 12 is maintained in its closed position, to thereby cover and conceal the opening 13, by means of suitable fastening elements, such as the snap fastener elements 16 and 17 provided on the inturned edge portions 18 and 19 of the covering, these snap fastener elements being engaged by the complementary fastener elements shown at 14 and 15 on the flap 12. The closed position of the flap 12 is shown in Fig. 1. It will, of course, be understood that other types of fastening means, such as a slide or so-called "zipper" fastener might be employed in place of the snap fastener elements shown.

For convenience in carrying the bag, a loop-like handle 20 is provided at the top or apex of the bag, directly over the cross-bar 4 of the frame.

When the bag is to be used as a bag, bathing suits, lunch, towels and a host of other articles useful at the beach or at picnics or automobile trips may be stored within the bag, the articles being placed therein by merely opening the flap 12 and inserting them through the opening 13. The handle 20 permits the bag to be carried with a minimum of effort, and since the handle is located at the vertical center line of the bag, the bag is well balanced and is thus easily carried. If the fabric covering employed is of waterproof or water-repellant material damp bathing suits or other articles can be readily carried in it.

The triangulated or wedge-shape of the frame over which the covering is applied, and the manner in which the frame is constructed, is such that while the frame is very light in weight, it is of exceptional strength. Thus, the bag may be readily used as a seat by merely placing it down on one of its sides 7 or 8 and sitting upon it, the frame and the relatively strong fabric covering being quite capable of supporting the weight of the average person.

When it is desired to employ the bag as a back-rest, it is stood upon its bottom 10 and the panel 9 of the covering will at once provide an inclined support against which the back of the user may be comfortably rested. It will be noted that the curved cross bars 4, 5 and 6 permit the fabric covering to be inwardly depressed to thus fit the curvature of the back so that comfort in the use of the device as a back-rest is assured.

In the embodiment of the invention shown in Figs. 1 to 5, the frame is made of one-piece construction by welding the cross-pieces in place. To facilitate the covering of the frame with the cover fabric and to render the device more compact for shipment, it may be found desirable to provide a collapsible or "knock-down" frame, an example of which is disclosed in Figs. 6 to 8 inclusive.

Therein, the frame is shown as being made up of three similar rectangular frame units 20, 21 and 22 placed together as shown in Fig. 6. It will be noted that the adjacent bars of these frame members are held together by coupling sleeves 23 which securely attach the adjacent bars together and produce a rigid and sturdy structure. The coupling sleeves may be held in place by any suitable fastening means, such as by bolts 24 extending through lugs or ears 25 provided on the sleeves. Other means for fastening the sleeves in clamping position on the frames may be employed, or the several frame units 20, 21, and 22 may be joined together by other connecting means. With an arrangement of this character, the triangulated frame can be readily set up inside of the completed cloth covering, thus making the fabrication of the cloth covering a relatively simple and inexpensive operation, and permitting the device to be shipped in "knock-down" condition to be assembled by the user.

While I have described one embodiment of the invention, it is obvious that the same is not to be restricted thereto, but is broad enough to come within the scope of the claims appended hereto. While the bag is shown of a triangular or wedge-shaped, the shape may be varied somewhat; the fastening devices used may be of a nature different from those disclosed, and other changes may be made as will be apparent to those skilled in this art.

What I claim is:

1. An article of the character described comprising, a rigid and fixed frame triangular in vertical cross section and covered with fabric to form a bag having upwardly sloping front and rear walls which converge at an apex of the frame, the fabric covering extending upwardly for a portion only of the front wall of the frame, leaving an access opening in the front wall extending from the upper termination of the front wall covering to the top or apex of the frame, a closure flap foldable downwardly from the top of the bag to overlie and close said opening, and fastening means for holding the closure flap in its closed position, the rear wall covering being continuous and extending from the top to the bottom of the bag and, when the bag is rested on its bottom, serving as an inclined back-rest.

2. An article of the character described comprising, a rigid frame structure triangular in vertical cross section and defining a wedge-shaped bag frame, flexible fabric covering stretched over the bag frame to enclose the same and to form a bag having two upwardly sloping side walls converging at an apex, the covering being provided at the top or apex of the bag with a carrying handle, said covering having a closure flap beginning adjacent to said handle and extending downwardly therefrom for a portion of the length of one of the sloping side walls of the bag, means for detachably holding said flap in closed position, the sloping side wall of the bag opposite to that provided with the flap being uninterrupted from the top of the bag to its bottom to enable said side wall to serve as an inclined back-rest when the bag is rested on its bottom, and the frame including inwardly bowed cross braces behind said back-rest side wall, said bowed braces serving to accommodate the back-rest to body curvature.

JOSEPH B. STIER.

REFERENCES CITED

The following references are of record in the file of this patent:

UNITED STATES PATENTS

| Number | Name | Date |
| --- | --- | --- |
| 691,376 | Harter | Jan. 21, 1902 |
| 830,396 | Winter | Sept. 4, 1906 |
| 1,222,175 | Bobrick | Apr. 10, 1917 |
| 2,016,520 | Short | Oct. 8, 1935 |
| 2,170,379 | Ortt | Aug. 22, 1939 |
| 2,361,743 | Butler | Oct. 31, 1944 |

FOREIGN PATENTS

| Number | Country | Date |
| --- | --- | --- |
| 34,900 | Germany | Mar. 22, 1886 |